(12) United States Patent
Murao et al.

(10) Patent No.: US 6,216,581 B1
(45) Date of Patent: Apr. 17, 2001

(54) FLUID CYLINDER ASSEMBLY

(75) Inventors: Yoshio Murao, Kobe; Fumio Watanabe, Amagasaki; Takanobu Tokushige, Sakai, all of (JP)

(73) Assignee: Taayo Ltd., Osaka (JP)

( * ) Notice: Subject to any disclaimer, the term of this patent is extended or adjusted under 35 U.S.C. 154(b) by 0 days.

(21) Appl. No.: 09/375,365

(22) Filed: Aug. 17, 1999

(30) Foreign Application Priority Data

Oct. 14, 1998 (JP) .................................................. 10-291959

(51) Int. Cl.$^7$ ....................................................... F15B 15/26
(52) U.S. Cl. ................................................. 92/5 R; 92/161
(58) Field of Search ........................................ 92/5 R, 161

(56) References Cited

U.S. PATENT DOCUMENTS

| | | | |
|---|---|---|---|
| 3,664,184 | * | 5/1972 | Dyer .................................. 73/862.191 |
| 4,058,178 | * | 11/1977 | Shinohara et al. ................. 92/5 R X |
| 4,860,639 | * | 8/1989 | Sakaguchi ............................... 92/5 R |
| 5,163,660 | * | 11/1992 | Yamaoka et al. ...................... 267/136 |
| 5,905,212 | * | 5/1999 | Moses et al. ...................... 73/862.451 |

FOREIGN PATENT DOCUMENTS 2569871  2/1998  (JP) .

* cited by examiner

Primary Examiner—John E. Ryznic
(74) Attorney, Agent, or Firm—Birch, Stewart, Kolasch & Birch, LLP

(57) ABSTRACT

A fluid cylinder assembly of the kind provided with a cylinder tube in which a piston coupled by a piston rod operates. The cylinder tube has one end connected with a rod cover. The piston rod passes through an aperture in the rod cover and projects outwardly. The rod cover is associated with means for mounting the fluid cylinder assembly on a frame and a load transducer which converts a change in load axially acting thereon to a change in voltage or current and develops an electric signal. The movement of a lead wire extending outwardly of the load transducer is precluded, and the results of measurement are obtained with a high degree of accuracy.

11 Claims, 6 Drawing Sheets

FLUID CYLINDER ASSEMBLY

BACKGROUND OF THE INVENTION

1. Field of the Invention

This invention relates to a fluid cylinder assembly incorporating load transducers (as defined hereinafter) for detecting the thrust exerted by a piston rod.

2. Description of the Prior Art

The prior art fluid cylinder assembly is useful for various purposes such as subjecting a component part of a machine to press fit, clamping, chucking, roller pressure or stamping. According to the purpose for which the fluid cylinder assembly is used, it is necessary to detect the magnitude of thrust exerted by a piston rod or the magnitude of load acting on the component part.

For example, when a component part of a machine is subjected to press fit, force exerted thereon is measured with a view to using the measured value for passing a judgment on whether or not the component part has been properly subjected to press fit.

It is known to measure such force by means of a load cell carried either on the outer end of the piston rod (as disclosed in Japanese Utility Model Registration No. 2,569,871) or on a cap cover secured on the end of a cylinder tube opposite the end at which the piston rod is extendible and retractable.

The load cell carried on the outer end of the piston rod assures that the results of measurement are obtained with a high degree of accuracy, because the magnitude of load acting on the component part can be directly measured. The trouble is that a lead wire extending outwardly of the load cell moves as the piston rod moves. Therefore, a supporting member or members have to be employed as a means to movably support the lead wire and prevent it from being disconnected.

In case of the load cell carried on the cap cover, the output taken from the load cell contains not only the magnitude of load acting on the component part but also the magnitude of gravity acting on the fluid cylinder assembly per se. Especially when the fluid cylinder assembly is mounted on a vertical supporting structure in cantilever fashion, i.e., with the cap cover allowed to support the gross weight of the fluid cylinder assembly, the output taken from the load cell contains not only the magnitude of thrust acting on the component part but also the magnitude of angular moment acting on the fluid cylinder assembly per se. A marked decline in the accuracy of measurement results therefrom.

SUMMARY OF THE INVENTION

The present invention is concerned with eliminating the aforesaid difficulty. As such, the primary object of the invention is to provide a fluid cylinder assembly which precludes the movement of a lead wire extending outwardly of a load cell and allows the results of measurement to be obtained with a high degree of accuracy.

As indicated above, the invention is concerned with a fluid cylinder assembly of the kind provided with a cylinder tube 11 in which a piston 12 coupled by a piston rod 13 operates. The cylinder tube 11 has one end connected with a rod cover 14. The piston rod 13 passes through an aperture in the rod cover 14 and projects outwardly. In one described embodiment, the rod cover 14 is associated with means 27 for mounting the fluid cylinder assembly on a frame FM and a transducer which converts a magnitude in load axially acting thereon to a magnitude in voltage or current and develops an electric signal (hereinafter referred to as the "load transducer").

In another described embodiment, the load transducer includes two flanges lying on, and perpendicular to, the axis of the fluid cylinder assembly and disposed in spaced parallel relation with each other. A thin cylindrical wall capable of elastic deformation is interposed between, and integrally formed with, these two flanges and extends coaxially of the fluid cylinder assembly. At least one strain sensor is mounted on the thin cylindrical wall.

DESCRIPTION OF THE PREFERRED EMBODIMENTS

First Embodiment

Figure 1:
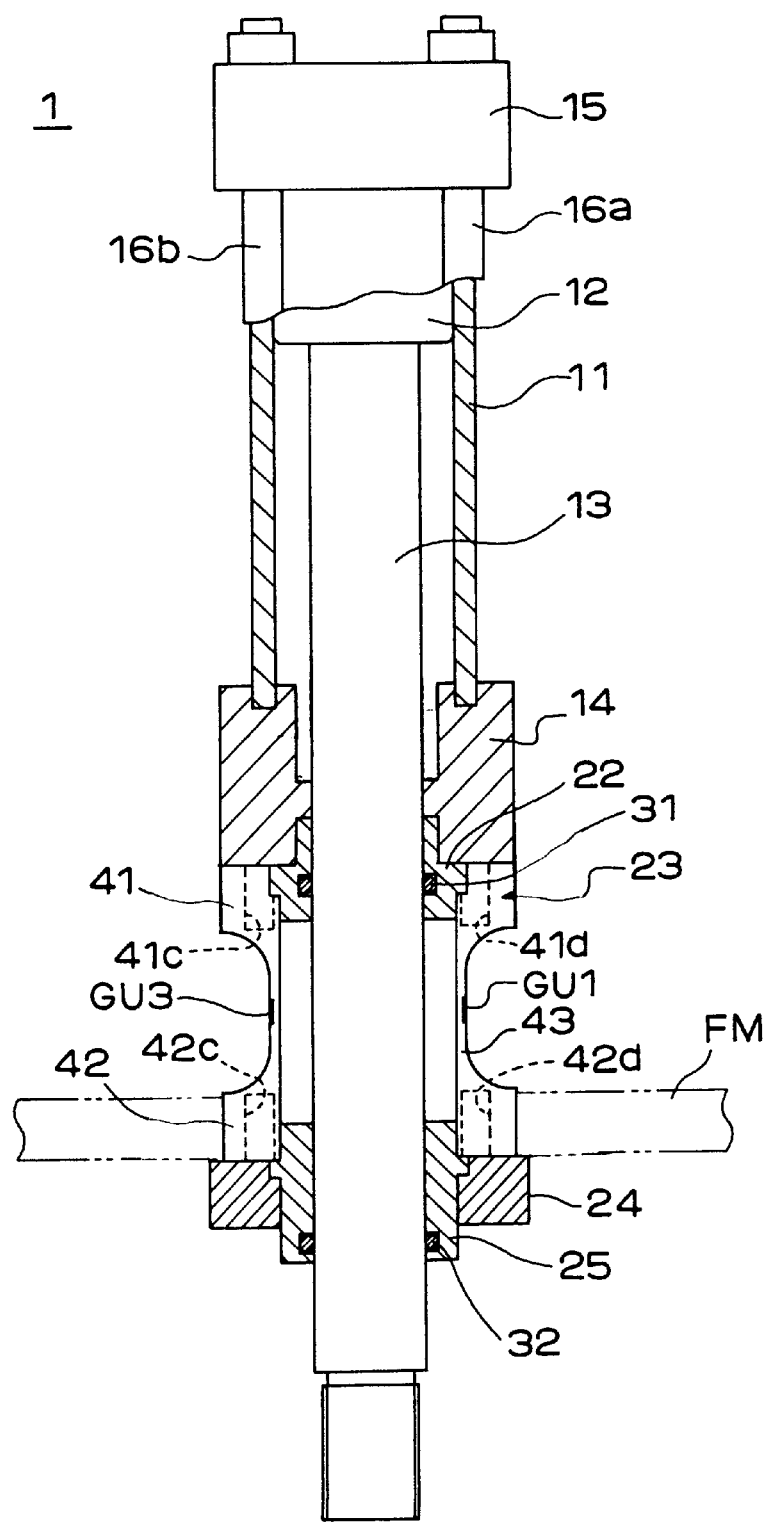
FIG. 1 is a fragmentary front view of one embodiment of the invention.
Figure 2:
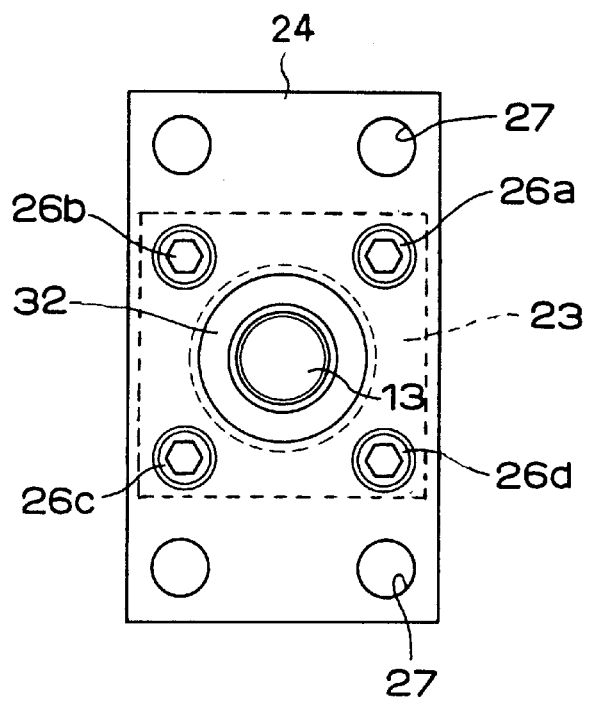
FIG. 2 is a bottom plan view thereof.
Figure 3:
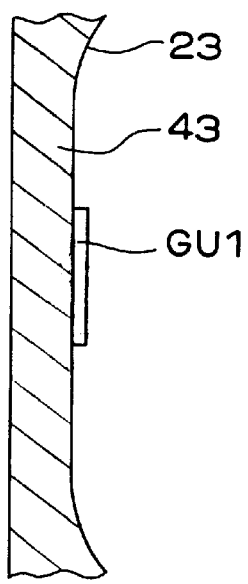
FIG. 3 is a sectional view of a part thereof where a strain gauge is mounted.

In FIGS. 1 and 2, the numeral 1 designates a fluid cylinder assembly of a first embodiment. FIG. 3 is a sectional view of a part of a load transducer 23 incorporated therein where a strain gauge GU1 is mounted.

The fluid cylinder assembly 1 shown in FIGS. 1 and 2 comprises a cylinder tube 11, piston 12, piston rod 13, rod cover 14, cap cover 15, four tie bolts 16a to 16d, gland ring 22, load transducer 23, flange 24 and bush 25.

The load transducer 23 is made up of flanges 41 and 42, thin cylindrical wall 43 and strain gauges GU1, GU2, etc. The flange 41 serves to connect the load transducer 23 with the rod cover 14 by means of tie bolts 16a to 16d threaded into holes 41a to 41d in the flange 41. The flange 24 is connected with the flange 42 of the load transducer 23 by means of bolts 26a to 26d threaded into holes 42a to 42d in the flange 42 through the flange 24. The outer surface of the thin cylindrical wall 43 curves towards the top and the bottom and terminates with a larger compass than the middle portion so as to form the flanges 41 and 42. The thin cylindrical wall 43 undergoes elastic deformation in proportion to the magnitude of thrust acting thereon.

Referring now to FIGS. 1 to 3, four strain gauges GU1 to GU4 are adhered to four circumferentially equidistantly spaced positions respectively on the outer surface of the thin cylindrical wall 43 so as to be strained in response to load axially acting on the region between the flanges 41 and 42 and generate a signal proportional to the load. A lead wire extending outwardly of each strain gauge GU is connected to an amplifier.

The piston 12 is slidably mounted in the bore of the cylinder tube 11. The piston rod 13 coupled by the piston 12 moves together with the piston 12. The piston rod 13 passes through an aperture in the rod cover 14 and projects outwardly.

The rod cover 14, cap cover 15, cylinder tube 11 and load transducer 23 are associated with each other as follows: The holes 41a to 41d in the flange 41 are tapped to engage the threaded ends of the tie bolts 16a to 16d respectively. Each of the tie bolts 16a to 16d has the other threaded end passing through an aperture in the cap cover 15 and then allowing a nut to be threaded tightly thereupon.

As has been above explained, the flange 24 is connected with the flange 42 of the load transducer 23 by means of bolts 26a to 26d threaded into holes 42a to 42d in the flange 42 through the flange 24. The flange 24 is provided with holes 27 to be engaged by bolts (not shown) for mounting the fluid cylinder assembly 1 on the frame FM.

A fluid under pressure can be introduced into the interior of the cylinder tube 11 through ports (not shown) provided in the rod cover 14 and the cap cover 15 to cause the piston rod 13 to assume the retracted and extended positions respectively.

The space between the piston rod 13 and the internal surface of the load transducer 23 is sufficient to permit the enclosure of grease. The piston rod 13 may possibly lightly abut against the internal surface of the bush 25. Such abutment has been found undesirable in order to obtain the results of measurement with a high degree of accuracy. A seal 31, which serves also as a seal, is provided on the internal surface of the gland ring 22. A scraper 32 is provided on the internal surface of the bush 25. The provision of the scraper 32 has also been found undesirable in order to obtain the results of measurement with a high degree of accuracy.

The application of the fluid cylinder assembly 1 to a case where a fluid under pressure is introduced into the interior of the cylinder tube 11 through a port provided in the cap cover 15 to cause the piston rod 13 to assume an extended position so as to allow the outer end of the piston rod 13 to subject a component part of a machine to press fit will now be described as an example of the manner in which the fluid cylinder assembly 1 works.

When the piston rod 13 is assuming an extended position, the fluid cylinder assembly 1 generates a thrust which is substantially equal to the force exerted on the component part. This thrust is axially applied to the load transducer 23 and causes the thin cylindrical wall 43 to be deformed. Then the strain gauges GU generate signals, which are subjected to arithmetic operations so that the magnitude of the thrust may be found.

The output taken from the load transducer 23 contains not only the magnitude of thrust acting on the component part but also the magnitude of gravity acting on the fluid cylinder assembly per se. However, this gravity has a known fixed quantity and can be easily corrected by calculation.

When the load transducer 23 undergoes force other than axial force, e.g. bending moment or torsional moment, the undesirable effect of such force can be circumvented by using appropriate strain gauges GU and by making an appropriate connection therefor.

It will be appreciated that certain significant advantages are obtained from the fluid cylinder assembly 1 as follows: The load transducer 23 permits the measurement of thrust to be carried out easily and with a high degree of accuracy. Since the load transducer 23 does not move during measurement, the movement of lead wires extending outwardly of the strain gauges GU is precluded. Therefore, the lead wires can be secured to a supporting structure. A wiring plan can be readily carried into effect, and yet the possibility of disconnection is obviated.

Dust and/or oil attached to the piston rod 13 is scraped away by the scraper 32. Thus the surface of the piston rod 13 is substantially completely cleaned such that dust and/or metal powder is prevented from getting into the cylinder tube 11. However, the invention is based on the realization that the scraper 32 does not necessarily need to be used.

The strain gauges GU may be coated with a synthetic resin for the protection thereof. Alternatively, they may be provided with a cover.

Second Embodiment

Figure 4:
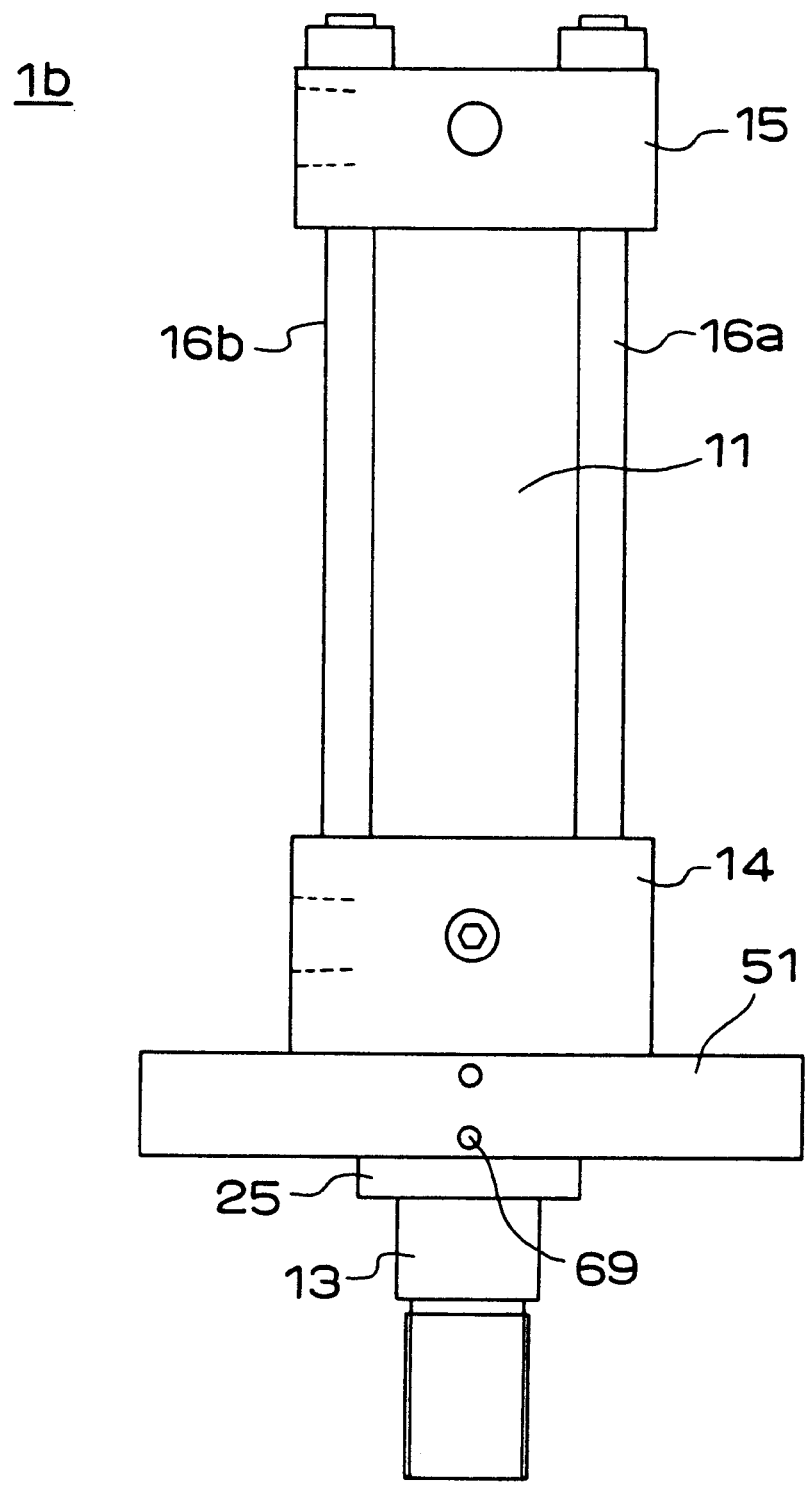
FIG. 4 is a front view of another embodiment of the invention.
Figure 5:
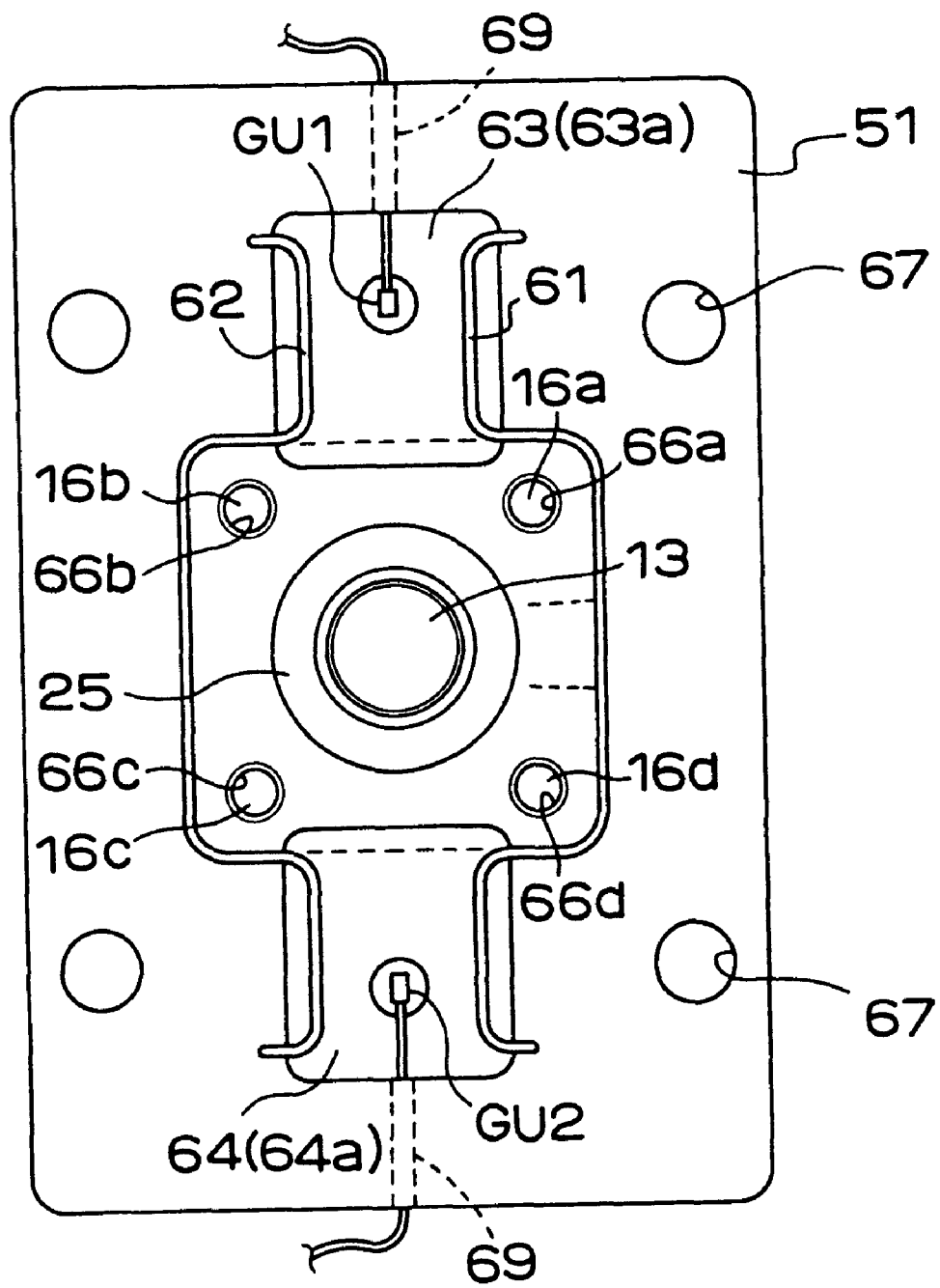
FIG. 5 is a bottom plan view thereof.
Figure 6:
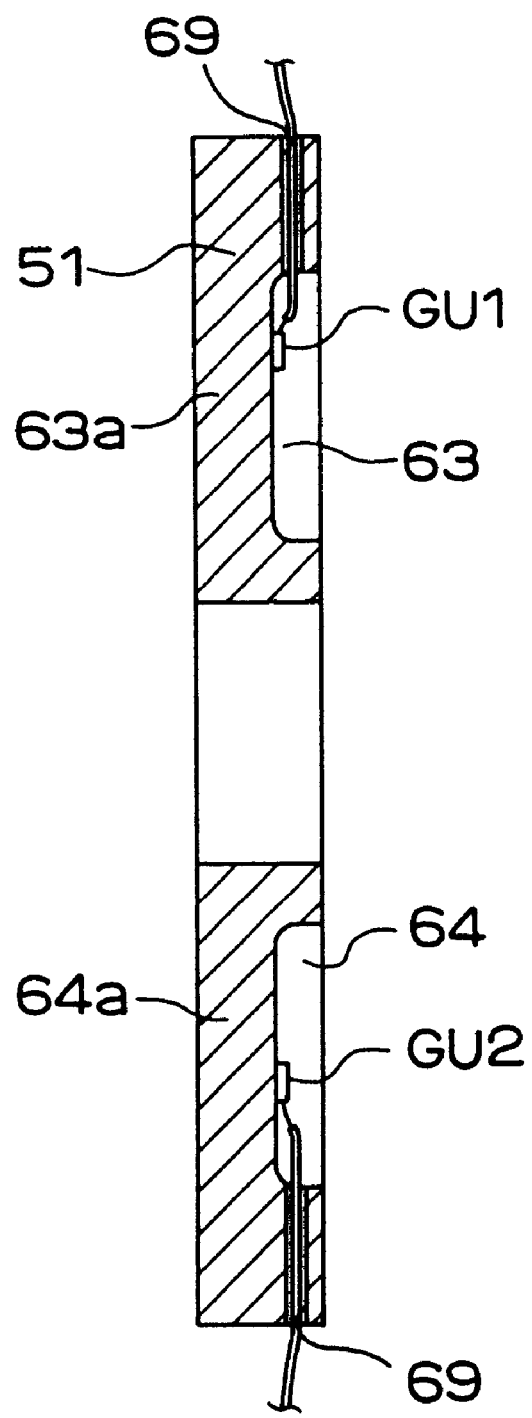
FIG. 6 is a sectional view of a plate-shaped member.

In FIGS. 4 and 5, the numeral 1b designates a fluid cylinder assembly of a second embodiment. FIG. 6 is a sectional view of a plate-shaped member 51 used therein. Like numerals are employed to designate component parts functioning in substantially the same manner as the previously described ones. These component parts will need no further description, or it will be sufficient to comment briefly thereon.

Referring now to FIGS. 4 and 5, the plate-shaped member 51 is mounted on the rod cover 14. Four holes 66a to 66d are disposed closer to the center of the plate-shaped member 51 and are tapped to engage the threaded ends of the tie bolts 16a to 16d respectively, by which the component parts constituting the fluid cylinder assembly 1b are associated with each other.

Another four holes 67 are disposed closer to the edges of the plate-shaped member 51. These holes 67 are to be engaged by bolts (not shown) for mounting the fluid cylinder assembly 1b on the frame FM.

The central region where the holes 66a to 66d are disposed and the edge regions where the holes 67 are disposed are maintained in separated relationship by slits 61 and 62 opening through the upper and bottom surfaces (as viewed on FIG. 4) of the plate-shaped member 51. Recesses 63 and 64 are provided in one and the other end portions respectively of each slit such that each recess lies across both slits 61 and 62. Strain gauges GU1 and GU2 are adhered to thin portions 63a and 64a formed by the recesses 63 and 64 respectively.

Each of the recesses 63 and 64 is provided with a hole 69 through which a lead wire extending outwardly of each strain gauge GU passes.

Force exerted on the central region where the holes 66a to 66d are disposed is bound to act on the thin portions 63a and 64a and subject them to elastic deformation. Then the strain gauges GU generate signals proportional to the magnitudes of strain.

Thus the plate-shaped member 51 constitutes a combination of a load transducer and means for mounting the fluid cylinder assembly on the frame FM. The thrust generated by the fluid cylinder assembly 1b is measured on the basis of signals generated by the strain gauges GU adhered to the plate-shaped member 51.

Particular advantages obtained from the fluid cylinder assembly 1b reside in the facts that the strain gauges GU adhered to the plate-shaped member 51 permit the measurement of thrust to be carried out easily and with a high degree of accuracy and that, since the plate-shaped member 51 does not move during measurement, the movement of lead wires extending outwardly of the strain gauges GU is precluded.

Since the strain gauges GU are arranged in the recesses 63 and 64, they are free from outside interference.

While the second embodiment has been described particularly in connection with two recesses 63 and 64 provided in one side of the plate-shaped member 51, it will of course be apparent to those skilled in the art that another two recesses may be provided in the other side thereof so that there may be a total of four strain gauges GU adhered to four recesses respectively.

Figure 7:
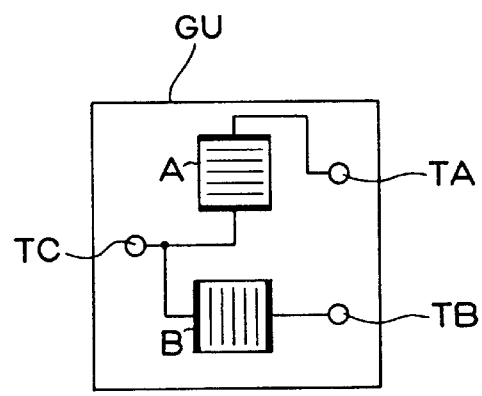
FIG. 7 provides a circuit diagram of an example of an electrical circuit incorporated in the strain gauge.
Figure 8:
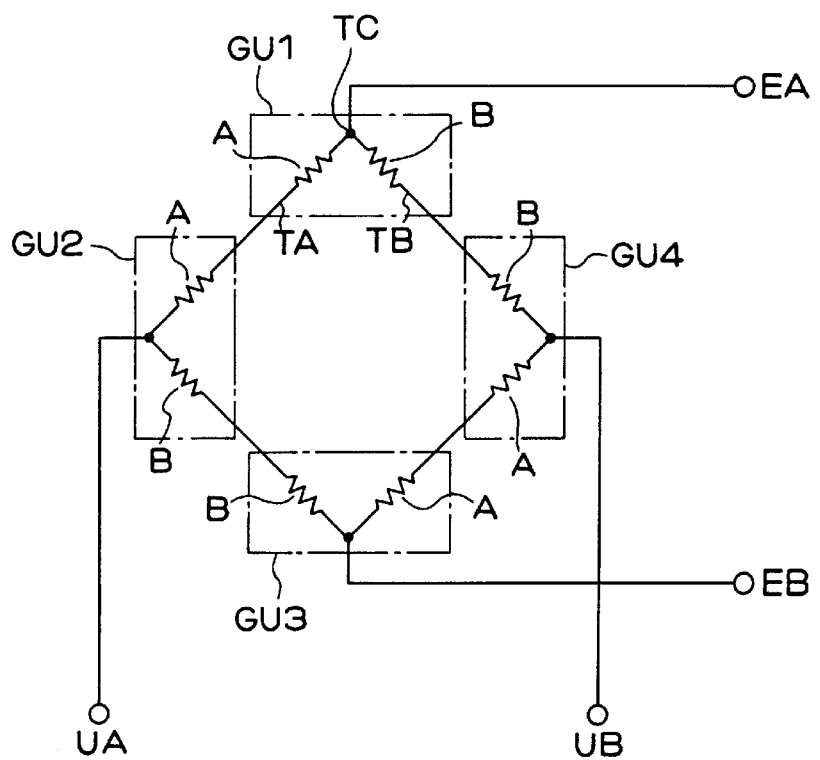
FIG. 8 provides a circuit diagram of an example of how to make a connection for the strain gauges.

FIG. 7 provides a diagrammatic illustration of an example of an electrical circuit incorporated in the strain gauge GU, and FIG. 8 provides a diagrammatic illustration of an example of how to make a connection for the strain gauges GU1 to GU4.

The strain gauge GU shown in FIG. 7 includes two resistive elements A and B. An increase or decrease in the resistance of each of these two resistive elements A and B depends on the direction in which it is expanded or contracted. When the strain gauge GU as a whole is expanded vertically as viewed on FIG. 7, a decrease in the resistance of the resistive element A and an increase in the resistance of the resistive element B occur. Converses occur when the strain gauge GU as a whole is contracted vertically as viewed on FIG. 7.

Referring now to FIG. 8, four strain gauges GU1 to GU4 are connected to form a bridge. Each of four nodes of this bridge is constituted by a point TC where the terminals of two resistive elements A and B meet in each strain gauge GU. The resistive element A of one strain gauge GU is connected to the resistive element A of another strain gauge GU adjacent the first mentioned strain gauge GU, and the resistive element B of one strain gauge GU is connected to the resistive element B of another strain gauge GU adjacent the first mentioned strain gauge GU.

The input to the circuit is applied across the diagonally opposite nodes EA and EB of the circuit such that constant voltage across them is about 10 volts, and the output is taken from the remaining two nodes UA and UB. For zero adjustment to correct the imbalance between the strain gauges GU, a resistor having the same temperature characteristic as the strain gauges GU may be connected either across the nodes EA and UB or across the nodes EA and UA.

The arrangement of resistive elements to be employed when two strain gauges GU are used instead of four is such that a pair of opposite arms of the bridge consist of two resistive elements A respectively and another pair of opposite arms of the bridge consist of two resistive elements B respectively.

Various types of strain gauges may be used as the strain gauges GU. A connector or a terminal block may be used for connecting a lead wire extending outwardly of each strain gauge GU. Nuts may be used for securing the flanges 41 and 42 of the load transducer 23 in position with respect to the proximate surfaces. Many modifications and variations are possible with respect to the construction, shape and dimensions of the cylinder tube 11.

Changes in the construction, shape, dimensions and material of the load transducer 23, thin cylindrical wall 43, plate-shaped member 51, slits 61 and 62, and fluid cylinder assemblies 1 and 1b may be made without departing from the nature and principle of the invention.

What is claimed is:

1. A fluid cylinder assembly provided with a cylinder tube in which a piston coupled by a piston rod operates, said cylinder tube having one end connected with a rod cover, said piston rod passing through an aperture in said rod cover and projecting outwardly, the improvement comprising:

means for mounting the fluid cylinder assembly on a frame of a supporting structure;

a load transducer which converts a magnitude in load axially acting thereon to a magnitude in voltage or current and develops an electric signal accordingly; and said means and said load transducer being associated with said rod cover.

2. A fluid cylinder assembly as defined in claim 1, wherein said load transducer comprises:

two flanges lying on, and perpendicular to, the axis of the fluid cylinder assembly and disposed in spaced parallel relation with each other;

a thin cylindrical wall capable of elastic deformation interposed between, and integrally formed with, said two flanges and extending coaxially of the fluid cylinder assembly; and at least one strain sensor mounted on said thin cylindrical wall.

3. A fluid cylinder assembly as defined in claim 2, wherein said thin cylindrical wall includes an inner cavity adapted to enclose grease therein.

4. A fluid cylinder assembly as defined in claim 2, wherein said piston rod and said load transducer are maintained in spaced relation.

5. A fluid cylinder assembly as defined in claim 2, wherein one of said two flanges disposed farther from said cylinder tube is connected with a flange for mounting the fluid cylinder assembly on said frame of said supporting structure.

6. A fluid cylinder assembly as defined in claim 5, wherein a scraper for cleaning the surface of said piston rod is provided on the internal surface of said flange for mounting the fluid cylinder assembly on said frame of said supporting structure.

7. A fluid cylinder assembly as defined in claim 1, wherein said load transducer and said means for mounting the fluid cylinder assembly on a frame of a supporting structure are combined in a plate-shaped member having a central region and edge regions spaced therefrom by slits opening through an obverse side and a reverse side of said plate-shaped member, said central region serving to connect with said rod cover, and said edge regions serving to mount the fluid cylinder assembly on said frame of said supporting structure.

8. A fluid cylinder assembly as defined in claim 7, wherein said slits are symmetrically disposed at each side of a line intersecting the axis of said piston rod.

9. A fluid cylinder assembly as defined in claim 8, wherein the distance between said two slits is decreased in two portions symmetrical about the axis of said piston rod, said two portions being adapted to be subjected to elastic deformation.

10. A fluid cylinder assembly as defined in claim 9, wherein recesses are provided in said two portions respectively.

11. A fluid cylinder assembly as defined in claim 10, wherein strain sensors are mounted in said recesses, said strain sensors together with said two portions constituting said load transducer.

* * * * *

UNITED STATES PATENT AND TRADEMARK OFFICE
CERTIFICATE OF CORRECTION

PATENT NO. : 6,216,581 B1  Page 1 of 1
APPLICATION NO. : 09/375365
DATED : April 17, 2001
INVENTOR(S) : Yoshio Murao et al.

It is certified that error appears in the above-identified patent and that said Letters Patent is hereby corrected as shown below:

On the title page Assignee's Name should be corrected as follows:

[73] Assignee: TAIYO LTD. Osaka (JP)

Signed and Sealed this

Fifth Day of May, 2009

JOHN DOLL
*Acting Director of the United States Patent and Trademark Office*